UNITED STATES PATENT OFFICE.

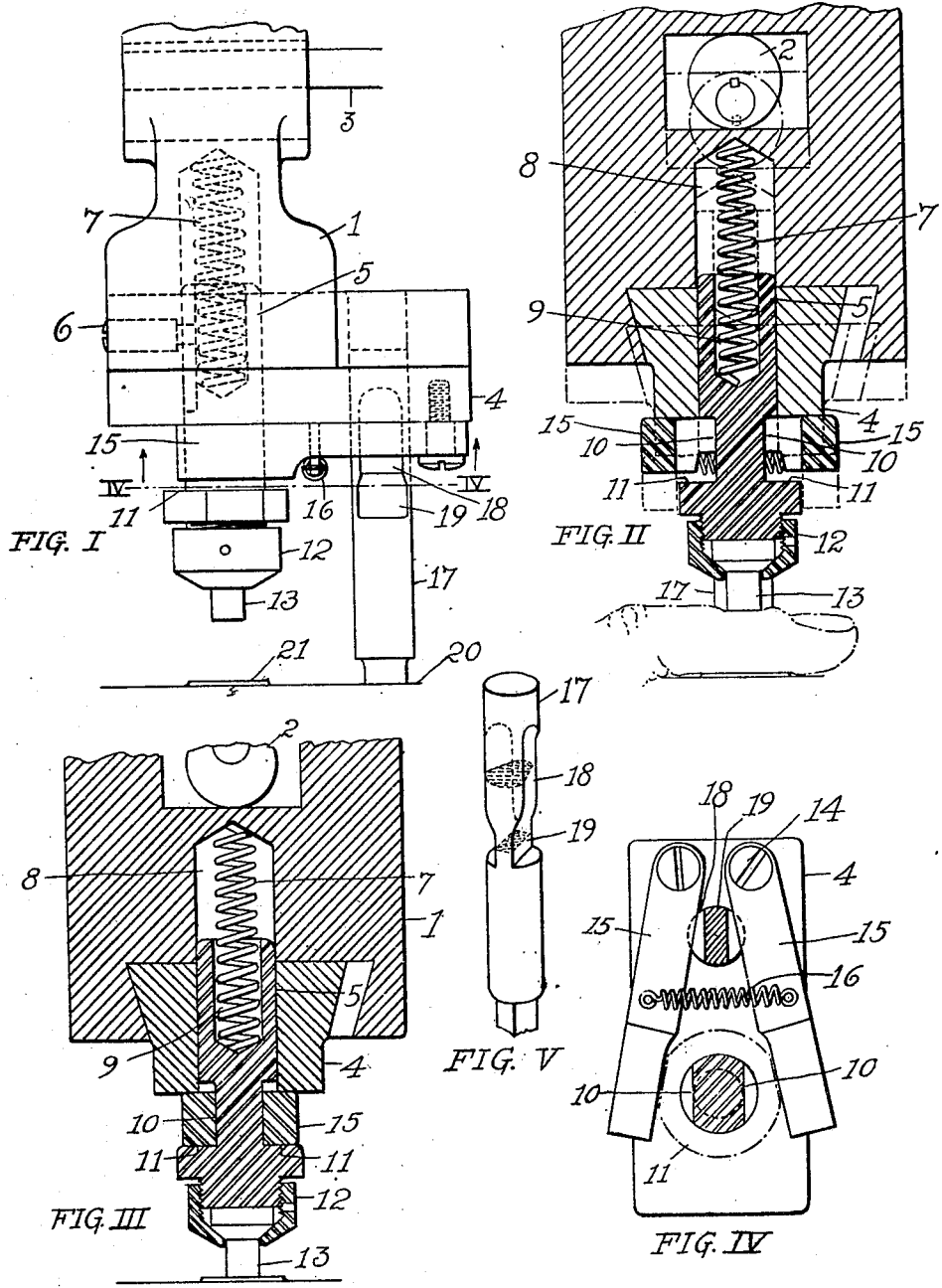

GEORGE H. DAY, OF SOUTHBRIDGE, MASSACHUSETTS.

SAFETY DEVICE.

1,308,775.  Specification of Letters Patent.  Patented July 8, 1919.

Application filed January 28, 1915. Serial No. 4,935.

*To all whom it may concern:*

Be it known that I, GEORGE H. DAY, a citizen of the United States, residing at Southbridge, in the county of Worcester and State of Massachusetts, have invented certain new and useful Improvements in Safety Devices, of which the following is a specification.

This invention relates to improvements in safety devices, and has particular reference to an improved device particularly adapted for use upon punches, presses, cutters, or the like.

The leading object of the present invention is the provision of an improved safety device for the prevention of injury to the fingers or hands of the workman operating the machine.

A further object of the invention is the provision of an automatically operating safety device which shall serve to render a punch, cutter, press, or the like, inoperative when the hand of the workman is in position to be injured thereby, but which will insure the satisfactory and efficient operation thereof on the work to be performed.

Another object of the invention is the provision of an improved safety device which will in nowise interfere with the usual convenience of operation of the machine, and which will be so essentially a part of the machine that it will be impossible for the operator to discard the said safety device.

Other objects and advantages of my improved construction should be readily apparent by reference to the following description taken in connection with the accompanying drawings, and it will be understood that I may make any modifications in the specific details of construction shown and described within the scope of the appended claims without departing from or exceeding the spirit of my invention.

Figure I represents a side elevation of one type of machine equipped with my device.

Fig. II represents an enlarged vertical sectional view.

Fig. III represents a view similar to Fig. II with the parts locked in operative relation.

Fig. IV represents a sectional view on the line IV—IV of Fig. I looking in the direction of the arrows, and Fig. V represents a perspective view of the controlling wedge.

In the drawings, in which similar characters of reference are employed to denote corresponding parts throughout the several views, the numeral 1 designates the head or reciprocating portion of a punch press or the like, suitable mechanism such as the eccentric 2 on the driven shaft 3 being employed to impart vertical reciprocating movement to the head 1. It will be understood, however, that while it has been illustrated as operating vertically, that it may be arranged horizontally or at any desired angle without in anywise varying the operation of the parts.

Carried by the head 1 is the frame plate 4 having slidably mounted therein the tool spindle 5 locked against rotation as by the pin or screw 6, and normally pressed downward by the spring 7 contained within the chamber 8 of the head 1 and the chamber 9 of the spindle. This spring is formed relatively light to permit of ready yielding of the spindle 5 while normally holding the same in depressed position, as indicated by the full line in Fig. II.

In that form of my invention here illustrated I have shown the spindle 5 as having the recesses 10 formed therein at each side below which are the wide bearing shoulders 11, a suitable nut or other mechanism 12 serving to removably secure the tool 13 on the lower end of the spindle.

Pivoted at 14 to the member 4 are the pair of spindle locking members 15 connected by a spring 16 tending to draw the same into the recesses 10. The purpose of the fitting of the members 15 into the recesses 10 will be best understood by reference to Fig. III, from which it will be seen that when the members 15 lie within the recesses they rest on the shoulders 11 referred to and serve to transmit pressure to the tool spindle 5 from the member 4 in which said spindle is slidably mounted.

On the other hand, should the locking members 15 be prevented from entering the recesses 10, the downward movement of the head 1 and member 4 will serve to compress the spring 7 without any force other than that of the spring being applied to the tool. This will possibly be best understood by reference to the dotted line in Fig. II.

To normally hold the jaws or locking members 15 in open position and out of the recesses 10, any suitable means may be employed, in the drawings a wedge member or controlling spindle 17 being illustrated having the flattened sides 18 normally engaged between the members 15, as when the parts are in raised position, as shown in Figs. I and II, and being further provided with the reduced or thin portion 19.

It is to be noted that the member 17 has been shown as rising from the base or work support 20, but it will be understood that it may be suitably secured in desired position in any other manner, as by suspending from a bracket or other over-head support, or from the driven shaft 3, or the like. The only essential is that it be so supported that there will be a relative movement of the wedge member 17 and the jaws or locking members 15 as the tool is moved toward the work.

This movement, as should be readily understood by reference to the drawings, will cause the members 15 to slide downward along the portion 18 onto the thin portion 19 of the wedge or controlling member, this portion 19 being sufficiently thin to allow the jaws 15 to move together into the position shown in Fig. III. On the other hand, upward movement of the head 1 and parts carried thereby will slide the jaws upward off the thin portion 19 onto the thick end 18 of the wedge, forcing the jaws apart into open position and there retaining them, as is indicated in Figs. II and IV.

In the operation of my improved safety device, the position of the portion 19 of the wedge or controlling member is suitably determined according to the thickness of the work to be operated on. In Fig. I, I have shown a thin blank 21 to be engaged by the tool 13. Consequently, the portion 19 may be so arranged that the parts will reach nearly their lowest position before the members 15 are released to permit them to be swung inward by the spring 16 to lock the tool to move with the head 1.

The purpose of this is most clearly shown in Fig. II, in which it is to be noted that when anything much thicker than the work to be operated on, such as a finger, which would otherwise be injured, or a heavy tool, which would break the press or other machine, should the tool 13 be brought forcibly down thereon, is in position beneath the tool, the said finger or member will prevent any downward movement of the tool spindle 5. Downward movement of the head 1 will then merely compress the spring 7, the members 15 being sufficiently spaced apart to permit the shouldered portion 11 of the spindle to pass therebetween, as is indicated in the dotted lines in Fig. II. Consequently, by the time said members 15 have reached the thin portion 19 of the controlling member or wedge, the members or locking jaws 15 will be resting against the outer face of the portion 11 of the spindle and will simply ride downward on said face without carrying the tool spindle downward. Consequently, the only pressure applied to the finger or other device, will be that of the spring 7 whose tension is sufficiently light to prevent any injury.

If the finger or the thick member were not present, however, the locking jaws 15 would reach the thin portion of the wedge before any pressure was brought against the tool 13 or lower portion of the spindle, and would securely lock the spindle to move with the head 1, as indicated in Fig. III, in which event any desired pressure or force could be applied to the tool through the head 1.

From the foregoing description taken in connection with the drawings, it will be seen that with a machine equipped with my improved safety device properly set, it will be impossible for an operator to crush or injure a finger or the like, destruction of special dies on account of a tool carelessly left therebeneath when operating the machine will be prevented, while at the same time the usual type of guards tending to obstruct free access to the work are eliminated, and ready access to the work is provided for.

I claim:

1. In a safety device for a press, the combination with a movable press head, of a tool supported for movement relative to the press head, means for yieldingly holding the tool in operative position, locking jaws for engaging the tool holder to secure the same in fixed position relative to the head, and a wedge member having a thick portion normally between the jaws to retain the same in inoperative position, and a thin portion onto which the jaws may move and thus be shifted into operative position before a tool carried by the holder is brought into engagement with the work.

2. A device for the purpose described, including the combination with suitable pressure applying mechanism, of a tool holder mounted for yielding movement relative to the pressure mechanism, means for resiliently holding the holder in operative position, a tool carried by the holder, a work support, a controlling wedge mounted in fixed position relative to the work support, a pair of jaws pivoted to the pressure mechanism and normally held in open position by engagement with the thicker portion of the wedge, a spring for automatically closing the jaws when the same are in engagement with the thinner portion of the wedge, and shoulders on the tool holder for engagement with the jaws, the position of the thinner part of the controlling wedge being such that the jaws are held in inoperative position until the tool holder and tool carried thereby are in proximity to the work on the work support, whereby yielding movement of the tool holder prior to the releasing of the jaws will allow the shoulders to move between the jaws and hold the same out of operation, substantially as and for the purpose described.

In testimony whereof I affix my signature in presence of two witnesses.

GEORGE H. DAY.

Witnesses:
H. K. PARSONS,
E. M. HALVORSEN.